Dec. 7, 1926.
H. J. LIPE
SIGNALING DEVICE
Filed Jan. 30, 1926    2 Sheets-Sheet 1
1,609,560
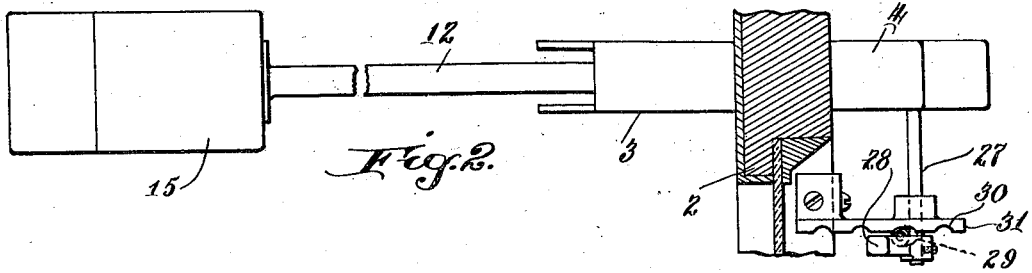
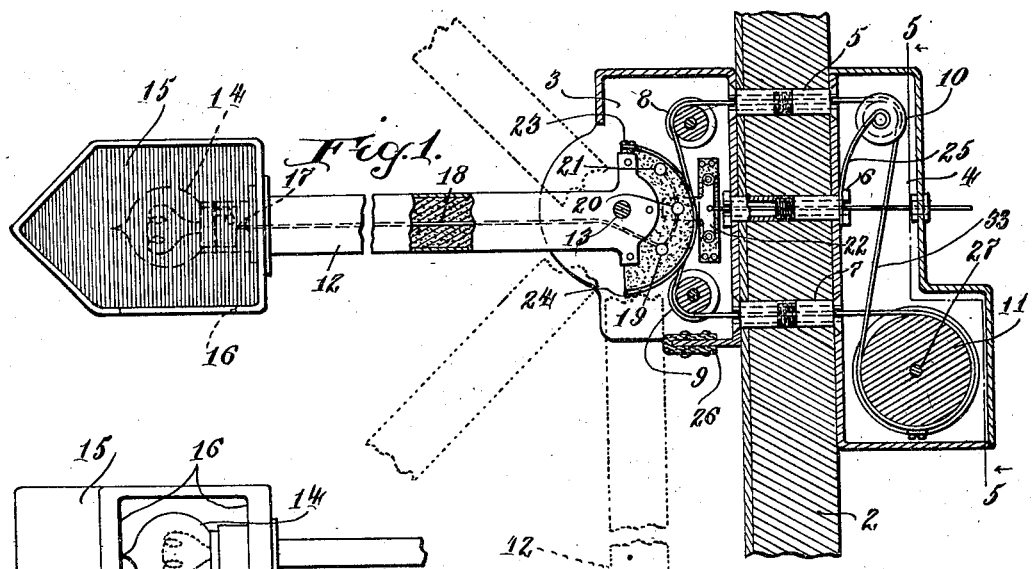
INVENTOR.
Howard J. Lipe
BY Thomas W. Y. Clark
ATTORNEY.

Dec. 7, 1926.

H. J. LIPE

SIGNALING DEVICE

Filed Jan. 30, 1926

INVENTOR.
Howard J. Lipe
BY
Thomas W. Y. Clark
ATTORNEY.

Patented Dec. 7, 1926.

1,609,560

UNITED STATES PATENT OFFICE.

HOWARD J. LIPE, OF LOS ANGELES, CALIFORNIA.

SIGNALING DEVICE.

Application filed January 30, 1926. Serial No. 84,893.

My invention relates to new and useful improvements in a signaling device for use on motor vehicles and the like. Most devices of this kind are too large, or rattle, due to faulty construction or design or they are placed on the vehicle in an inconvenient place. The object of my invention is to overcome these difficulties, to make a small, neat, compactly constructed device, the operating handle of which is near to the steering wheel. The device may be readily and neatly attached to the side door or it may be built in any type of vehicle. The simplicity of the device also does away with the expense of more elaborate signals. The light in the arm of the device takes the place of a separate parking light.

These and other objects and advantages will be brought out more fully hereafter.

In the drawings:—

Figure 1 is a rear view partially in section of the device attached to the side of a vehicle.

Figure 2 is a plan view of the same.

Figure 3 is an inverted plan view of the pointer and light.

Figure 5:
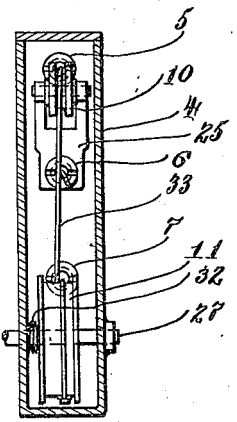

Figure 5 in a view on line 5—5 of Figure 1 looking in the direction of the arrows.

Figure 6:
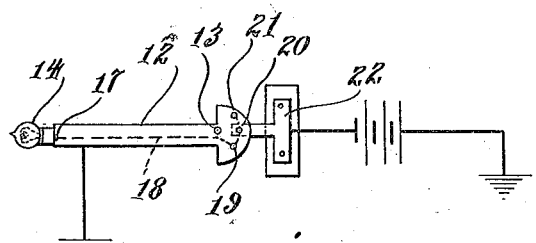
Figure 4:
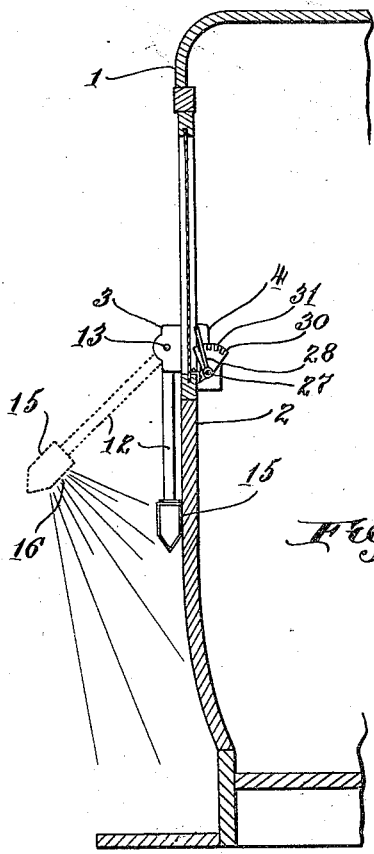
Figure 4 is a rear view of the arm showing the side of a vehicle in section and showing the device attached to the vehicle.

Figure 6 is a diagrammatical view of the electric circuit.

Similar numerals refer to similar parts throughout the several views.

The signal is shown attached to the door 2, of a closed motor vehicle 1. The supports 3 and 4 are screwed on each side of the door by means of hollow telescoping screws, 5, 6 and 7 each screw having an enlarged head with a slot across the rim for receiving a screwdriver. These bolt heads may be countersunk into the supports so that they will be out of the way of the other mechanism. Each support may be a channel bar with pulleys, 8 and 9 in the outer one and 10 and 11 in the inner one. Between pulleys 8 and 9 arm 12 is pivoted at 13. Pivot 13 is between the ends of the arm and well above the center of the arm. Arm 12 has an electric light 14 on its outer end which is enclosed by a pointed casing 15 the outer edge of which is integral with the arm. In the front of the casing is a piece of blue ground glass and in the rear, a piece of red ground glass. The center of the lower edge of the casing frame is cut away as at 16. This permits the light to come out as a beam, and it is directed downwardly, so that it shines on the vehicle step, thus making a step light.

The light 14 is held in the arm 12, the arm, vehicle door and body forming a ground for the light, one pole of the electric battery being likewise grounded. The center contact 17 of the light 14 is connected to a wire 18, insulated from the arm, and leading back through the arm, the other end of the wire passing to insulated connected contacts, 19, 20 and 21. These contacts are insulated by having one face of the inner end of the arm cut away and having therein an insulating material into which the wire and contacts are placed. The three contacts are each an equal distance from the pivot 13. Attached to the wall of the channel bar facing the contacts is a piece of insulation to keep them from contacting with said wall. Mounted on a piece of insulation on the other wall is a fixed spring contact plate 22, which is on the center contact when the arm is out straight, on the upper one when it is pointing upward at an angle of 45 degrees and on the lower one when pointing downward at 45 degrees. When in any other positions the light is out. The fixed end of the spring contact is connected with an insulated wire passing through bolt 6 to the inside of the vehicle where it is attached to the other pole of the battery.

These contacts are on the inner end of the arm, on a sector of a circle made by the inner end of the arm and the insulating material. A cable 33, is fast at 23 to the sector and from there it goes over the sector, under pulley 9, all the way around pulley 11, crossing itself as shown, and to which it is fast so that no creeping takes place, then around pulleys 10 and 8, back around the sector and it is fastened at 24, to the lower part of the sector. Pulley 10 is resiliently mounted in a steel plate spring 25 held fast by bolt 6. The spring tends to push pulley 10 away from pulley 8, thus holding the cable tight and preventing any rattling of the arm or pulleys.

The lower edge of support 3 is provided with a rubber bumper at 26 for the arm in its vertical position, which is its position of rest. The location of the pivot 13 above the center of the arm gives a longer radius for the upper part of the cable when the arm hangs down, so that spring 25, pulling on the upper cable part pulls the arm down slightly harder than the lower part of the cable would pull it up, even if pulley 11 were freely rotatable. But where pulley 11 is held stationary, the longer radius helps materially in holding the arm down, and still.

The off-center location of pivot 13 also permits the arm to swing in nearer to the vehicle body.

Pulley 11 is fast to rod 27 which has a projecting portion to which a flat handle 28 is fastened with a set screw. Facing the pulley is a small roller 29 in the flattened handle, being held by a pin passing lengthwise of the handle through two struck-in ears in said handle. Only the small face of said roller projects from the handle. The roller works over and is held in place by indentations 30 in a small sector 31 fast to the vehicle door near the window. Pulley 11 takes up about half the internal width of the support 4 and the other half contains a coil spring 32, surrounding a rod 27, tending to pull the handle roller 29 against sector 31. The indentations 30 in the sector are four in number, one for the arm in its downward position of rest and one for it in each of its other three position of 45 degrees below the horizontal, the horizontal and 45 degrees above the horizontal. These extended positions indicate a stop, or when the vehicle is parked, a parking light, or a step light, a left hand turn, and a right hand turn respectively.

The operation of my invention will be apparent from the foregoing description, and while it is shown attached to the door of a closed vehicle it may be attached to any suitable part of the vehicle, or it may be built into the vehicle at the time of the manufacture of the body.

Many changes in the device may be made without departing from the spirit of my invention.

I claim:

1. In a signaling device for the side of a vehicle, a support on the outside of a vehicle, a vertically and outwardly swinging arm pivoted between its ends in said support, vertically rotatable pulleys mounted one above and one below the pivot of said arm, a cable having its two ends fast to the inner end of said arm and between its ends passing tightly around said pulleys, and rotating means on the pulley shaft of one of said pulleys, said means having a resilient locking device to hold them in a desired position.

2. In a signaling device for the side of a vehicle, a support on the outside of the vehicle, a vertically and outwardly swinging arm pivoted between its ends in said support, vertically rotatable pulleys mounted one above and one below the pivot of said arm, a cable having its two ends fast to the inner end of said arm and between its ends passing tightly around said pulleys, and rotating means on the pulley shaft of one of said pulleys, the other of said pulleys being resiliently mounted to hold said cable tight.

3. In a signaling device for the side of a vehicle, inner and outer supports on the side of a vehicle, a vertically and outwardly swinging arm pivoted between its ends in said outer support, an upper pulley above and a lower pulley below the pivot of said arm in said outer support, an upper pulley and a lower pulley in said inner support, all said pulleys rotating vertically, a cable fast to the inner end of said arm and passing under said outer lower pulley, over, then under, said inner lower pulley, crossing itself, over said upper pulleys, and again being fast to the inner end of said arm, the grooves of connected pulleys being in alignment, said cable passing through openings in the side of said vehicle, and means to rotate said inner lower pulley.

4. In a signaling device for the side of a vehicle, inner and outer supports on the side of a vehicle, a vertically and outwardly swinging arm pivoted between its ends in said outer support, an upper pulley above and a lower pulley below the pivot of said arm in said outer support, an upper pulley and a lower pulley in said inner support, all said pulleys rotating vertically, a cable fast to the inner end of said arm and passing under said outer lower pulley, over, then under, said inner lower pulley, crossing itself, over said upper pulleys, and again being fast to the inner end of said arm, the grooves of connected pulleys being in alignment, said cable passing through openings in the side of said vehicle, and means to rotate said inner lower pulley, said means having a resilient locking device to hold them in a desired position.

5. In a signaling device for the side of a vehicle, inner and outer supports on the side of a vehicle, a plurality of connected openings passing through each of said supports and the vehicle side, means in said openings to hold said supports on the side of the vehicle, a vertically and outwardly swinging arm pivoted between its ends in said outer support, an upper pulley above and a lower pulley below the pivot of said arm in said outer support, an upper pulley and a lower pulley in said inner support, all said pulleys rotating vertically, a cable fast to the inner end of said arm and passing under said outer lower pulley, over, then under, said inner lower pulley, crossing itself, over said upper pulleys, and again being fast to the inner end of said arm, the grooves of connected pulleys being in alignment, said cable passing through certain of said openings in the side of the vehicle, and means to rotate said inner lower pulley, said means having a resilient locking device to hold them in a desired position.

6. In a signaling device for the side of a vehicle, inner and outer supports on the side of a vehicle, a vertically and outwardly swinging arm pivoted between its ends in said outer support, an upper pulley above and a lower pulley below the pivot of said arm in said outer support, a resiliently mounted upper pulley and a lower pulley in said inner support, all said pulleys rotating vertically, a cable fast to the inner end of said arm and passing under said outer lower pulley, over, then under, said inner lower pulley, crossing itself, over said upper pulleys and again being fast to the inner end of said arm, the grooves of connected pulleys being in alignment, said cable passing through openings in the side of said vehicle and means to rotate said inner lower pulley.

7. In a signaling device for the side of a vehicle, inner and outer supports on the side of a vehicle, a vertically and outwardly swinging arm pivoted between its ends in said outer support, a vertically swinging sector on the inner end of said arm, an upper pulley above and a lower pulley below the pivot of said arm in said outer support, a resiliently mounted pulley in the top and a pulley in the bottom of said inner support, all said pulleys rotating vertically, a cable fast to the upper part of said sector, and passing around said sector and under said outer lower pulley, over, then under said inner lower pulley, crossing itself, over said upper pulleys and around said sector, being fast to the lower part of said sector, connected grooves of said pulleys and of said sector being in alignment, the resilient mounting of said inner upper pulley tending to take up slack in said cable, said cable passing through openings in the side of said vehicle, and means to rotate said inner lower pulley.

8. In a signaling device for the side of a vehicle, inner and outer supports on the side of a vehicle, a plurality of connected openings passing through each of said supports and the vehicle side, means in said openings to hold said supports on the side of the vehicle, a vertically and outwardly swinging arm pivoted between its ends in said outer support, a vertically swinging sector on the inner end of said arm, an upper pulley above and a lower pulley below the pivot of said arm in said outer support, a resiliently mounted pulley in the top and a pulley in the bottom of said inner support, all said pulleys rotating vertically, a cable fast to the upper part of said sector, and passing around said sector and under said outer lower pulley, over, then under said inner lower pulley, crossing itself, over said upper pulleys and around said sector, being fast to the lower part of said sector, connected grooves of said pulleys and of said sector being in alignment, the resilient mounting of said inner upper pulley tending to take up slack in said cable, said cable passing through certain of said openings in the side of the vehicle, and means to rotate said inner lower pulley, said means having a resilient locking device to hold them in a desired position.

HOWARD J. LIPE.